July 4, 1944.                    G. S. BOYD                    2,353,009
                                MACHINE CENTER
                              Filed Jan. 30, 1943
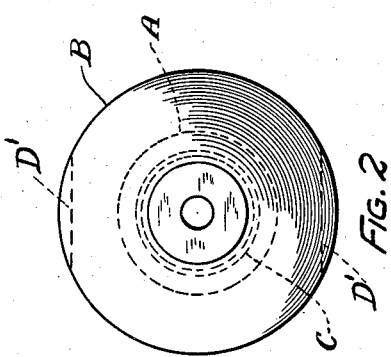
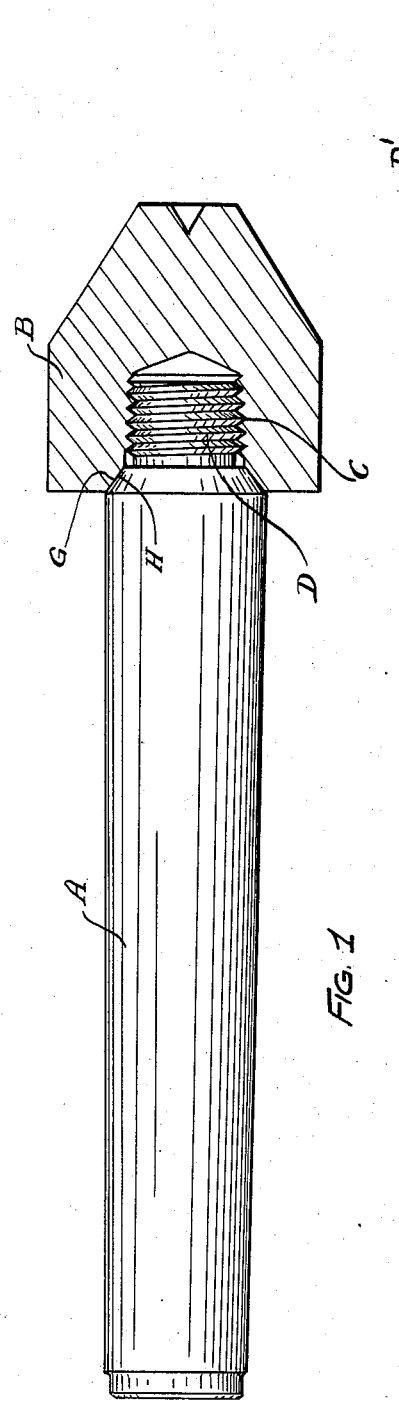
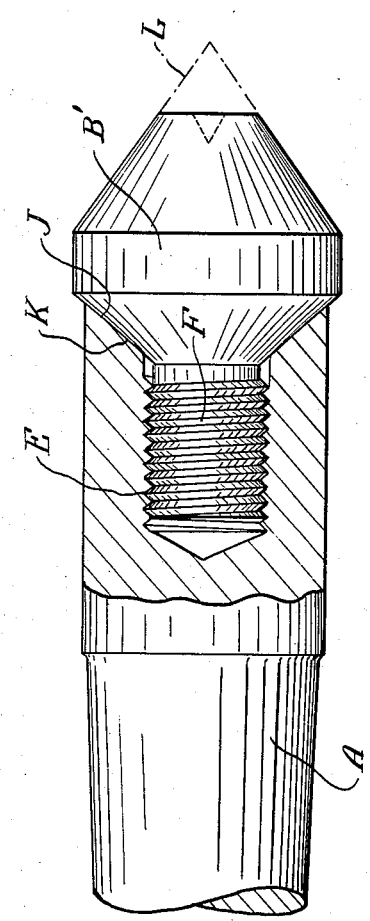
INVENTOR.
George S. Boyd,
BY
Hull & West
ATTORNEYS Patented July 4, 1944

2,353,009

UNITED STATES PATENT OFFICE 2,353,009

MACHINE CENTER

George S. Boyd, East Cleveland, Ohio

Application January 30, 1943, Serial No. 474,172

3 Claims. (Cl. 82—33)

This invention relates to work-supporting centers, such as are used for lathes, precision grinders, and other machines which embody spindles and which centers engage the pieces to be worked with the points or centers of the work-engaging portions thereof lying within the axes of said spindles.

It is the general purpose and object of the invention to provide a comparatively simple, inexpensive and reliable center for the purpose specified.

A further object of the invention is to design the center so that the shank or body thereof can be used indefinitely while the tips or noses can be renewed as occasion may require.

A still further object of the invention is to provide a cooperating construction of shank or body and removable tip or nose whereby the axis of the tip or nose will be maintained coincidental with the axis of the shank or body and whereby this coincidental relation may be maintained, notwithstanding repeated removals of the tip or nose for the purpose of machining the external surface thereof and the subsequent reassemblings of the tip or nose upon the shank or body. The ability to maintain this coincidence of axes is extremely important in connection with precision work.

I accomplish the foregoing objects in and through the construction and arrangement of parts shown in the drawing forming part hereof, wherein Fig. 1 represents a sectional elevation of a center constructed in accordance with my invention; Fig. 2 an end elevation of the form of my invention shown in Fig. 1; and Fig. 3 a view similar to Fig. 1 showing a modification of the construction shown in Fig. 1.

Describing the various parts by reference characters, A designates the shank or body member of a center, which shank or body member is preferably tapered in one direction so as to fit within the sleeve or spindle of a machine of the character referred to hereinbefore. B denotes the tip or nose member which, in the form of my invention shown in Fig. 1, is of the bull-nose type and is provided with a threaded recess C extending thereinto from the rear end thereof and which recess receives the external threaded end extension D of the shank or body member. The longitudinal center of the threaded end extension of the shank or body member and the longitudinal axis of the entire tip or nose member, including the recess C, are coincidental with the longitudinal axis of the shank or body member.

Notwithstanding this coincidence of axes, it is impossible to employ a tool comprising the parts thus far described in precision work, since the necessary clearance which is provided between the threads of the screws with which the parts C and D are provided will cause a departure of from .001 to .002 inch of the axis of the tip or nose member from coincidence with the axis of the shank or body member, and this departure is increased where the center is employed for supporting heavy work. Furthermore, when the tip or nose member is removed for the purpose of treatment in the manner described hereinbefore, it will be impossible to secure the coincidence of its axis with the axis of the shank or body member when reassembled upon the latter.

For the purpose of insuring this axial coincidence, I have provided the rear end of the tip or nose member B with a frusto conical surface G, said surface flaring radially outwardly and rearwardly from the rear end of the said recess, and I have also provided a complementary tapered surface H on the portion of the shank or body member which is at the rear of the threaded end thereof. It will be noted that, when the parts are assembled, there will be a clearance provided between the threaded end D of the shank or body member and the bottom of the recess C, thereby insuring the accurate seating of the tapered surfaces G and H, with consequent accurate alignment of the longitudinal axes of the shank or body member and the tip or nose member.

The tip or nose may be provided with flattened surfaces, indicated by dotted lines at D' in Fig. 2, for the reception of a wrench.

A further advantage arising from making a center wherein the tip or nose member is detachably connected with the shank or body member is the fact that it enables the use of ordinary and relatively inexpensive machine steel for the shank or body member while permitting the use of more expensive material, such as tool steel, for the tip or nose member and which latter material is capable of withstanding long usage.

In Fig. 3 there is shown a modification of my invention wherein the shank or body member A is provided with the internally threaded recess E and the tip or nose member B' with the threaded extension F. The shank or body member A is provided with a frusto conical tapered surface K extending radially outwardly and forwardly from the front end of said recess while the tip or nose member B' is provided with a complementary frusto conical surface J extending forwardly and outwardly from the extension F. When assembled, the axis of the tip or nose B' (including the threaded extension F) will be coincidental with the axis of the shank or body, including the recess E. From reference to Fig. 3, it will be seen that a pointed tip or nose member can be substituted for the "bull nose" tip or nose member shown in full lines, the pointed tip or nose being indicated at L in dot-and-dash lines.

Having thus described my invention, what I claim is:

1. A center of the character described comprising a body or shank member and a tip or nose member, one of the said members being provided with a reduced threaded extension and the other of said members being provided with an internally threaded recess for the reception of the said extension, the longitudinal axis of the body or shank member and the longitudinal axes of the tip or nose member and of the extension and recess being in coincidence when the body or shank member and the tip or nose member are assembled, the member which is provided with the extension having a frusto-conical seating surface extending radially outwardly from said extension and the member having the recess being provided with a complementary frusto-conical seating surface extending radially outwardly from the threaded portion of said recess and the recess having an unthreaded portion located inwardly beyond the threaded portion thereof whereby, when the said members are assembled, the frusto-conical surfaces thereof will be in engagement while a clearance will be provided between the end of the extension and the bottom of the recess.

2. A center of the character described comprising a body or shank member and a tip or nose member, the tip or nose member having a reduced threaded extension projecting from the rear thereof and the body or shank member having an internally threaded recess extending thereinto from the front end thereof, the longitudinal axis of the shank or body member, including the recess therein, and the longitudinal axis of the tip or nose member, including the threaded extension thereof, being coincidental when the shank or body member and the tip or nose member are assembled, the tip or nose member having a frusto-conical surface extending radially outwardly from its threaded extension and the shank or body member having a complementary frusto-conical surface extending radially outwardly from the threaded portion of the recess thereof, the recess having an unthreaded portion located rearwardly of the threaded portion thereof whereby, when the said members are assembled, the frusto-conical surfaces thereof will be in engagement while a clearance will be provided between the rear end of the extension and the bottom of the recess.

3. A center of the character described comprising a body or shank member and a tip or nose member, the body or shank member having a reduced threaded extension at the forward end thereof and the tip or nose member having an internally threaded recess extending thereinto from the rear end thereof for the reception of said threaded extension, the longitudinal axis of the shank or body member, including the threaded extension thereof, and the longitudinal axis of the tip or nose member, including the threaded recess thereof, being coincidental when the said members are assembled, the shank or body member having a radially outwardly and rearwardly extending frusto-conical seating surface located externally of the rear end of the extension thereof and the tip or nose member having a complementary frusto-conical surface located externally of the rear end of the threaded portion of the recess thereof, the recess having an unthreaded portion located forwardly of the threaded portion thereof whereby, when the said members are assembled, the frusto-conical surfaces thereof will be in engagement while a clearance will be provided between the front end of the extension and the bottom of the recess.

GEORGE S. BOYD.